H. FELDMEIER.
APPARATUS FOR HEATING AND COOLING LIQUIDS.
APPLICATION FILED JULY 21, 1914.
1,199,974.
Patented Oct. 3, 1916.
4 SHEETS—SHEET 1.
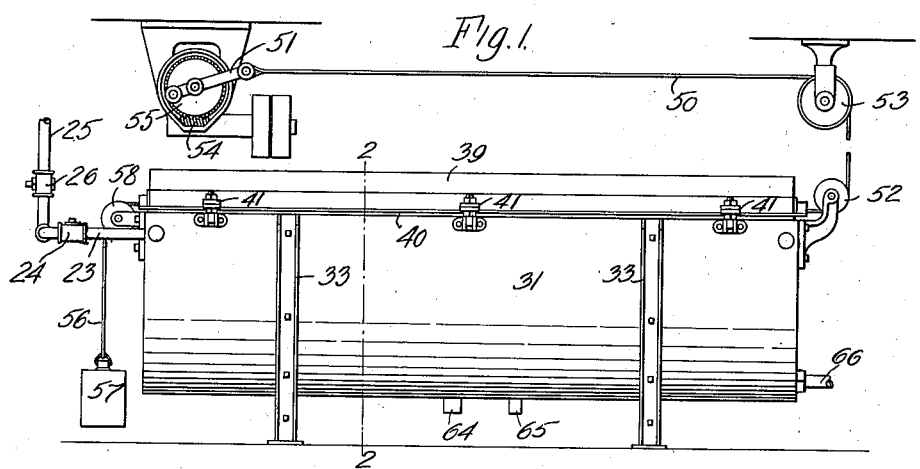
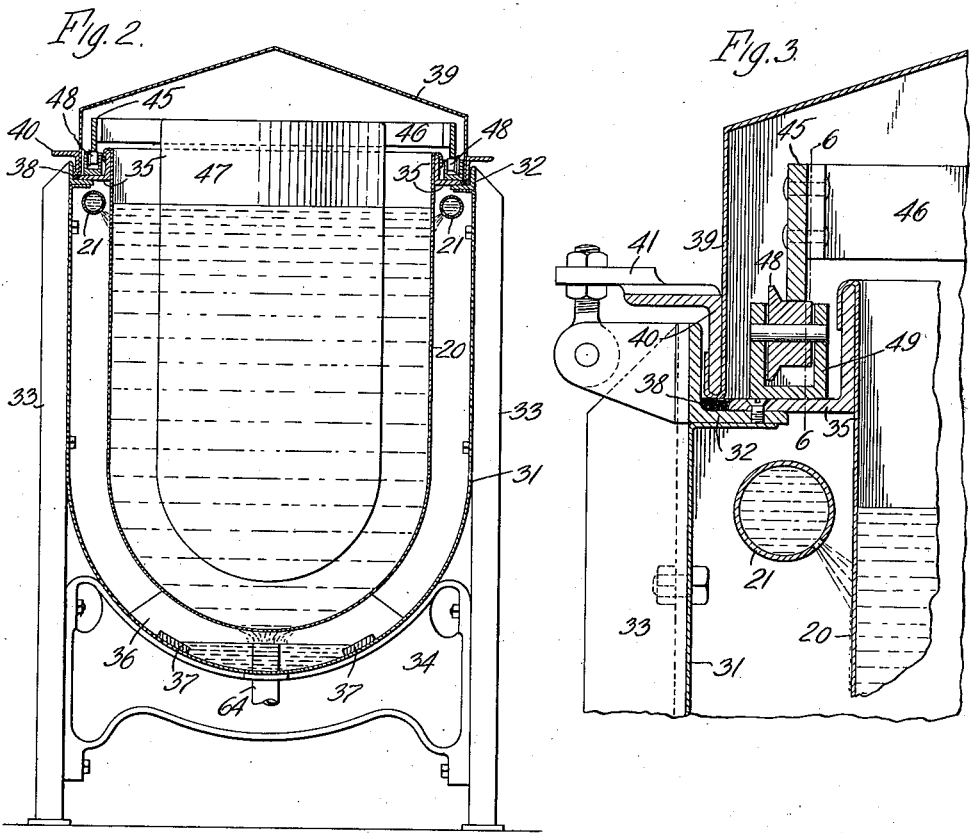
Witnesses
Richard Sommer
F. E. Prochnow
Inventor
Harvey Feldmeier,
by Wilhelm & Parker,
Attorneys.

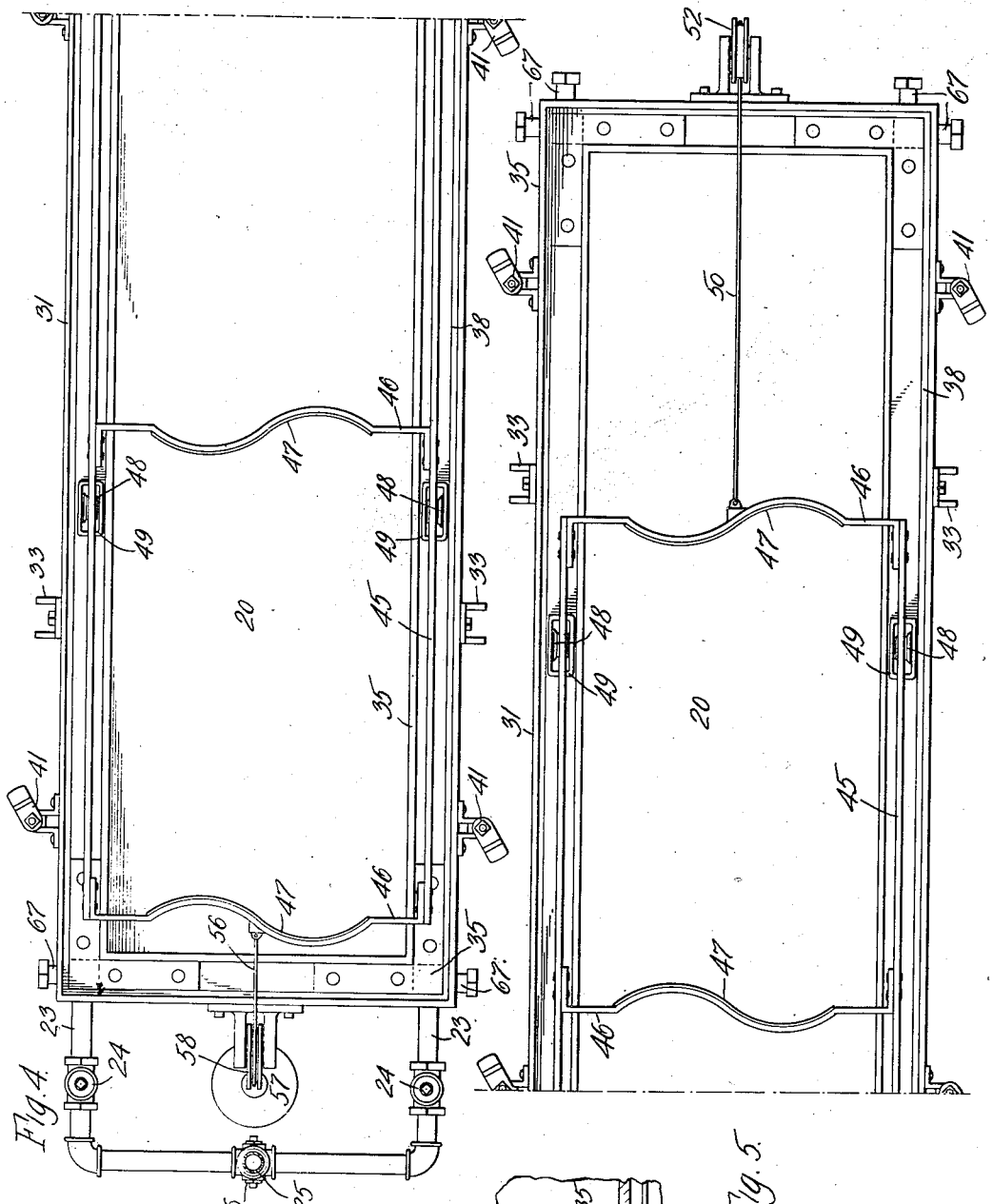

H. FELDMEIER.
APPARATUS FOR HEATING AND COOLING LIQUIDS.
APPLICATION FILED JULY 21, 1914.
1,199,974.  Patented Oct. 3, 1916.
4 SHEETS—SHEET 3.
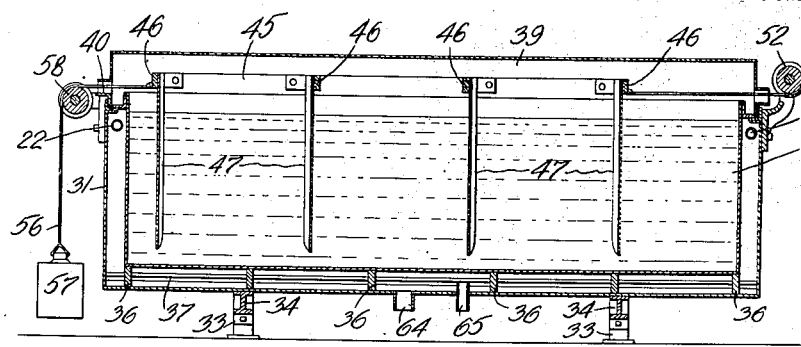
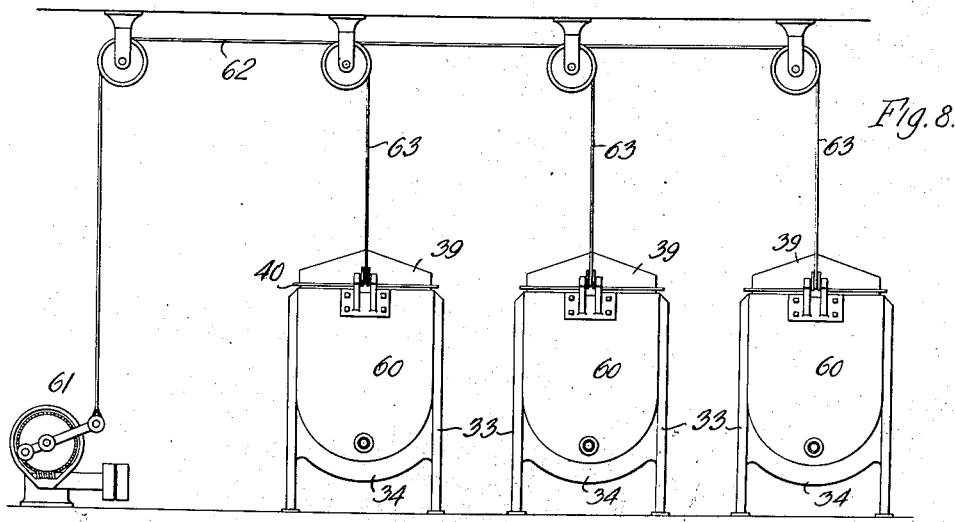
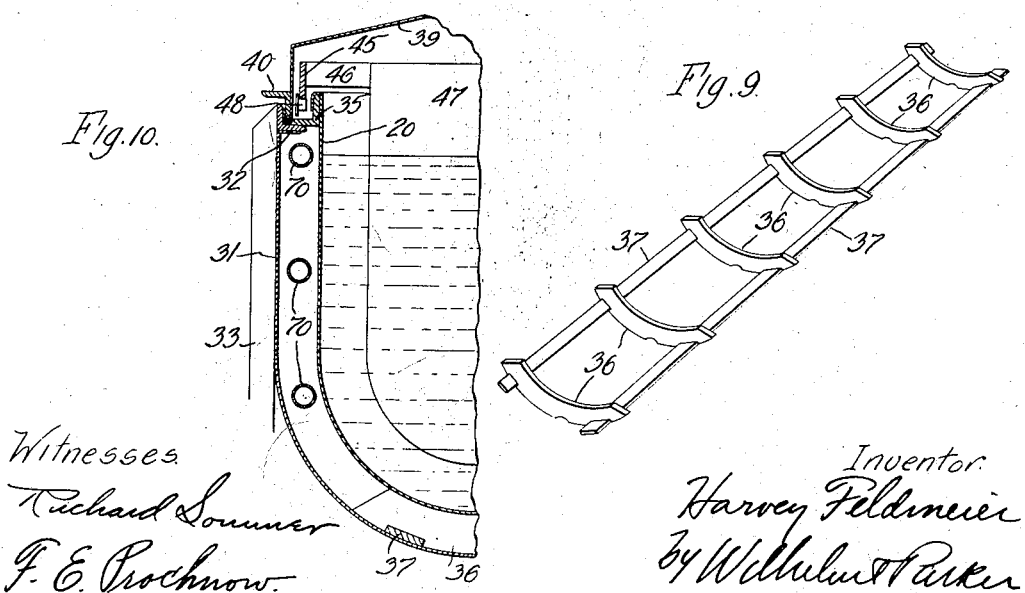
Witnesses
Richard Sommer
F. E. Prochnow
Inventor:
Harvey Feldmeier
by Wilhelm Parker
Attorneys.

H. FELDMEIER.
APPARATUS FOR HEATING AND COOLING LIQUIDS.
APPLICATION FILED JULY 21, 1914.

1,199,974.

Patented Oct. 3, 1916.
4 SHEETS—SHEET 4.

Witnesses.
Richard Sommer
F. E. Prochnow

Inventor.
Harvey Feldmeier,
by Wilhelm & Parker
Attorneys.

UNITED STATES PATENT OFFICE.

HARVEY FELDMEIER, OF LITTLE FALLS, NEW YORK, ASSIGNOR TO D. H. BURRELL & COMPANY, OF LITTLE FALLS, NEW YORK.

APPARATUS FOR HEATING AND COOLING LIQUIDS.

1,199,974.      Specification of Letters Patent.      Patented Oct. 3, 1916.

Application filed July 21, 1914. Serial No. 852,181.

*To all whom it may concern:*

Be it known that I, HARVEY FELDMEIER, a citizen of the United States, residing at Little Falls, in the county of Herkimer and State of New York, have invented a new and useful Improvement in Apparatus for Heating and Cooling Liquids, of which the following is a specification.

This invention relates to apparatus for heating or cooling liquids in a batch or charge placed in a vat or similar vessel and particularly to apparatus for treating milk and milk products, such as cream, skimmilk, buttermilk, whey, etc.

Vats for this purpose have been provided with heating and cooling means of various constructions, for instance, jackets forming around the vat a space which is filled with a heating or cooling liquid, or hollow stirrers through which a heating or cooling liquid is circulated.

The object of this invention is to provide such vats with more efficient and more economical means for heating or cooling the contents by applying the temperature changing liquid to the outer surface of the vat in a flowing film or thin layer, and keeping the body of liquid within the vat effectively in motion in such manner that the liquid flows with considerable speed along the inner surface of the vat.

Figure 11:
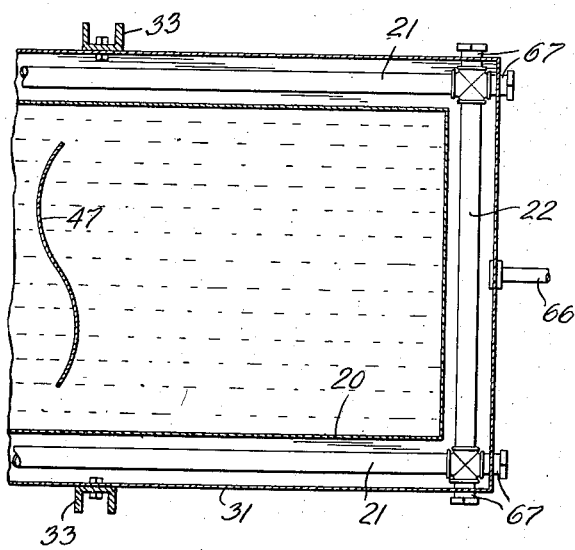
Figure 12:
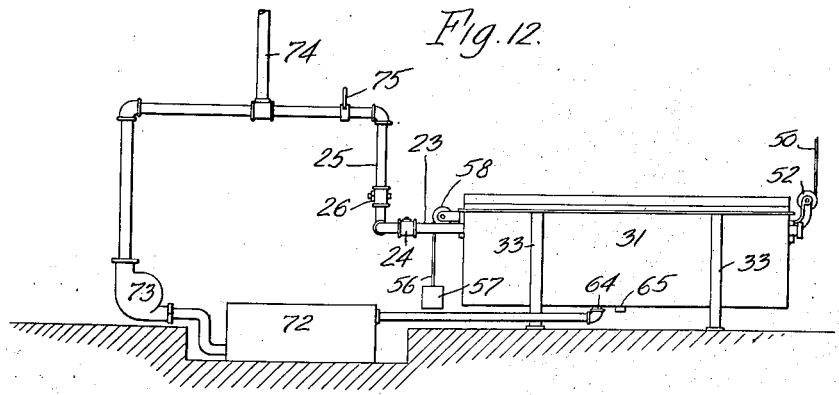

In the accompanying drawings: Figure 1 is a side elevation of the apparatus. Fig. 2 is a vertical cross section on line 2—2, Fig. 1, on an enlarged scale. Fig. 3 is a fragmentary vertical cross section of the upper portion of the apparatus on the same line but on a still larger scale. Figs. 4 and 5 are fragmentary top plan views of the apparatus with the cover removed, these two figures when taken together showing the entire length of the apparatus. Fig. 6 is a fragmentary longitudinal vertical section on line 6—6, Fig. 3. Fig. 7 is a vertical longitudinal section of the apparatus, on a reduced scale. Fig. 8 is an elevation showing a number of vats having their stirrers actuated from a common driving mechanism. Fig. 9 is a detached perspective view of the bottom stay frame. Fig. 10 is a fragmentary vertical cross section showing a modified arrangement of spray pipes. Fig. 11 is a fragmentary horizontal section of one end of the apparatus showing the longitudinal spray pipes provided with cross spray pipes. Fig. 12 is a diagrammatic elevation of the apparatus in connection with means for circulating the water through the spray pipes.

20 designates the vat or vessel in which the milk or other liquid to be heated or cooled is placed and which has approximately vertical sides and a convex or rounded bottom. The walls of this vat are made of some good heat conducting material, for instance, thin sheet copper. In order to heat or cool the liquid contained in the vat, means are provided for spraying the outer surface of the vat with a hot or cold liquid in such manner that the liquid flows in a film or thin layer downwardly over the outer surface of the vat. These means comprise longitudinal perforated spray pipes 21 arranged along each side of the vat near the top thereof and preferably also cross spray pipes 22, Fig. 11, connected to the longitudinal spray pipes and adapted to spray the ends of the vat. A pair of these cross spray pipes may project from each of the longitudinal spray pipes. Each set of spray pipes is fed through a pipe 23 which has a valve 24, and the pipes 23 are preferably fed from a common supply pipe 25 having a valve 26. The heating or cooling liquid sprayed against the walls of the vat near the top thereof forms a film or thin layer which flows down along the sides and bottom of the vat, the films clinging closely to the vat, until they reach the bottom, where they drop off. The vat is thus enveloped in a film or thin layer of running water.

31 represents an outer jacket or casing which forms a support for the vat and also a dead air space around the same, whereby excessive radiation of heat is prevented. The casing is provided along its upper edge with a horizontal rectangular frame 32 consisting of angle irons which have their lower flanges arranged to project inwardly from the casing. The latter is supported by upright frame members or posts 33, to the upper ends of which the angle frame 32 is secured. The upright frame members are connected below the casing by cross members 34 having concave upper sides upon which the curved bottom of the casing rests.

The vat is provided at its upper end with a rectangular frame 35 secured to the vat on the outer side thereof and composed of angle irons having their lower flanges projecting outwardly and resting upon the inwardly projecting flanges of the frame 32 of the casing, to which the frame of the vat is removably secured by any suitable means. The weight of the vat and its contents is preferably transmitted in part to the lower portion of the stationary frame by means of a stay device which is interposed between the curved bottom of the vat and the curved bottom of the casing, and which consists preferably of curved cross pieces 36 and longitudinal connecting bars 37 forming together a stay frame which may be constructed of wood. This stay device receives part of the load which would otherwise be carried by the rectangular top frames of the vat and casing and prevents deformation of the vat which is constructed of thin sheet metal. The top frames of the vat and casing form together a channel-shaped structure which extends around the four sides of the vat. The horizontal flange of the frame 35 of the vat does not extend quite to the upright flange of the surrounding frame of the casing and the space between the outer edge of the horizontal flange of the frame 35 and the upright flange of the frame of the casing is filled with a packing 38 of rubber or other suitable material upon which the cover 39 is seated. This cover is preferably provided along its lower edge with a stiffening angle iron 40 and is secured in place by any suitable means, for instance, as shown, by pivoted clamping bolts 41.

In order to cause the body of liquid in the vat to circulate in such manner as to bring all portions of the liquid frequently into contact with the walls of the vat, a suitable agitating device is used. The preferred construction of this agitator is as follows: 45 represents a horizontal rectangular frame having cross bars 46 and stirrer blades 47 depending from these cross bars into the vat. These blades have their edges arranged substantially parallel with the inner surface of the vat, leaving between each blade and the inner surface of the vat a comparatively narrow clearance or flow space. These blades are preferably constructed of sheet metal, for instance, sheet copper, and for the purpose of stiffening the same they may be corrugated, as shown.

The longitudinal side bars of the stirrer frame 45 rest upon flanged rollers 48 which are mounted in supports 49 secured to the top frame 35 of the vat. A slow reciprocating motion, preferably about five double strokes per minute, is imparted to the stirrer frame by any suitable mechanism. The preferred construction of this mechanism comprises a cord or cable 50 which is secured to one end of the stirrer frame and actuated by means of a rotary crank or arm 51 to pull the frame in one direction. This actuating cord runs over guide rollers 52 53 to the arm or crank 51 which is rotated slowly by a worm 54 and gear wheel 55. The mechanism comprises further a return cord 56 which is attached to the opposite end of the frame and to which a weight 57 is attached for pulling the stirrer frame in the opposite direction. This return cord passes over a guide roller 58. This reciprocating stirrer produces a lively movement of the liquid in the vat along the inner surface of the vat, alternately in opposite directions, and produces a frequent change of the liquid which is in contact with the inner surface of the sides and bottom of the vat and so causes a rapid transfer of heat between the film of liquid which flows downwardly on the sides and bottom of the vat and the liquid contained in the vat. No stuffing box is employed in this stirrer mechanism and the danger of leakage into or out of the vat is avoided. The vat is free from gears, pulleys and similar moving parts and conveniently accessible on all sides. Upon removing the cover the stirrer frame can be lifted from its supporting rollers, leaving the interior of the vat free for cleaning, and the vat itself can be easily lifted from the supporting top frame of the casing if repairs are to be made in the vat or access to the spray pipes or the interior of the casing is desired.

The actuating mechanism of the stirrer can be located at a considerable distance from the vat and can be placed overhead, as shown in Fig. 1, or on the floor, as shown in Fig. 8, or in any other desired position, thereby enabling both the vat and the driving mechanism of the stirrer to be located, respectively, in the most convenient places in the building. Several stirrers can be operated from a common driving mechanism, as shown in Fig. 8, where several vats 60 are arranged side by side and the stirrers are actuated from a single driving mechanism 61 and a single actuating cord 62 by branch cords 63.

The outer casing serves also as a catch basin for receiving the heating or cooling liquid dropping from the bottom of the vat and is provided in its bottom with a discharge pipe 64 through which the liquid drains off. When the heating liquid is returned by a pump to the feed pipe the pump draws the liquid from this pipe 64, and in that case an overflow pipe 65 is also provided which projects up into the casing above the bottom thereof and limits the height to which the water may rise in the casing.

The vat is provided with a discharge pipe or outlet 66 of any suitable construction.

The spray pipes may be supported in the outer casing by means of supporting arms 67, Fig. 11, which form continuations of the pipes and project through the casing, and are closed by removable caps to permit the pipes to be cleaned.

The operation of the apparatus is as follows: The milk or other liquid to be treated is placed in the vat and the agitator actuated so as to keep the milk in circulation and bring all parts of it into contact with the walls of the vat. If the milk is to be heated, hot water is pumped into the spray pipes and sprayed against the side walls of the vat until the temperature of the milk in the vat is raised to the desired point. In spraying the hot water against the side walls of the vat it is most economical to use only such quantity of water as will flow down the sides of the vat in a uniform but very thin film. When this is done the heat is largely taken out of the water and the operation of the apparatus is consequently highly efficient.

Difficulty is sometimes experienced when a small quantity of water is sprayed against the vat in preventing it from flowing down in small streams or rivulets instead of in the form of a film. It will flow in the form of a film, however, if the surface of the vat is first thoroughly wetted. This is most readily accomplished by spraying an excess of water against the walls of the vat so as to wet its entire surface and then reducing the flow of water until a thin film only flows over the surface of the vat. In case the supply of the heating liquid is of sufficient capacity it is simply necessary to open the main valve 26 wide and spray an excess of water against both sides of the vat until they are wet, and then to partially close the valve until the desired thin film is formed. In case the supply of hot water is insufficient to thoroughly wet both side of the vat simultaneously, the desired result may be accomplished by closing one of the individual valves 24 and throwing the entire supply of hot water into the spray pipes on the opposite side of the vat, which will be sufficient to wet that side of the vat, then almost closing the open valve 24 and opening the valve first closed so as to throw the greater part of the supply of water against the other side of the vat, and finally opening both valves 24 so as to divide the water evenly between the two sets of spray pipes, when the water will flow in the desired film. The water, whether hot or cold, will flow evenly down the sides of the vat and drop off the bottom into the outer casing, from which it will be discharged.

If the apparatus is used for pasteurizing milk or a similar liquid, the milk is first raised to the pasteurizing temperature, usually about 140° F., then held at such temperature for a sufficient period of time to accomplish the destruction of the bacteria as far as desirable or practicable, usually from 20 to 30 minutes, and then cooled to the bottling or preserving temperature.

The casing serves to retain most of the heat in the vat but there will be a certain amount of loss by radiation. This loss can be readily made up by continuing the flow of a small supply of water during the holding period over the sides of the vat at a suitable temperature.

After the milk has been held at the pasteurizing temperature for the desired length of time the heating liquid is turned off and the cooling liquid is supplied to the spray pipes and flows down the sides of the vat in a thin film and withdraws the heat from the milk in the vat. The cooling may be effected by first spraying cold well water against the vat and afterward ice water or brine. The milk may be kept in the vat at a low temperature as long as may be desired, so that the vat may serve as a storage as well as a treatment receptacle.

It is to be particularly noted that the space between the vat and the casing is not filled with the heating or cooling liquid, and in this respect the apparatus differs from double-walled vats in which a body of heating or cooling liquid fills the space around the vat. In this improved apparatus a more rapid and more economical heating or cooling of the contents of the vat is effected because all parts of the heating or cooling liquid are brought into intimate contact with the vat, and furthermore, the temperature of the contents can be more closely regulated and kept uniform. As no large body of heating or cooling liquid is used, the transition from the heating to the cooling operation in pasteurizing may be accomplished instantaneously and without the waste of any of the heating or cooling liquid.

While this improved apparatus can be used advantageously for various purposes, among them the tempering of cream in ripening the same, it is particularly desirable for pasteurizing milk and milk products. As a pasteurizing apparatus it supplies the dairyman who produces but a comparatively small amount of milk, at a moderate cost, with means for effectually and economically pasteurizing his product before sending it out.

Fig. 10 shows a modification of the invention in which a series of perforated spray pipes 70 are arranged one above the other. While this arrangement is less economical of the heating or cooling liquid, it has the advantage of bringing the liquid at its initial temperature practically into contact with all parts of the vat, thereby producing a corresponding rapid rise or fall of the temperature of the vat contents. Sufficient rapidity of operation for most purposes is, however, obtained by the first described arrangement in which the spray pipes are arranged near the top of the vat.

In Fig. 12 is shown a convenient arrangement for supplying the heating or cooling liquid to the spray pipes. The apparatus consists of a tank 72 preferably located at such a level that the water discharged from the bottom of the casing 31 will flow into it by gravity. The water is drawn from this tank by a pump 73 and forced by the latter into the supply pipe 25 which conducts it to the spray pipes. By this arrangement the same liquid is used over and over again. This not only results in an economical use of the liquid, but prevents the waste of heat remaining in the heating liquid after it has left the walls of the vat. The water discharged from the casing will be quite warm, particularly after the liquid in the vat has nearly reached its maximum temperature, and by using this water over again it will be necessary to supply only a small amount of heat to make up for the heat drawn out of the water in passing over the vat walls, to restore it to its initial temperature. This heat may be supplied in any suitable manner, as by injecting steam into the supply pipe through a pipe 74. The temperature of the liquid may be regulated with exactitude by controlling this supply of steam, a thermometer 75 being preferably inserted in the supply pipe to indicate the temperature of the liquid as it passes to the spray pipes. The cooling may be accomplished in a similar manner and with like advantages.

I claim as my invention:

1. An apparatus for changing the temperature of liquids comprising a horizontally elongated trough-like vat having an open top, and side walls and a rounded bottom composed of heat conducting material, a removable cover for the vat, means for directing a temperature-changing liquid against the side walls of the vat and causing the liquid to flow downwardly in a film over the outer surface of said side walls and bottom of the vat, a stirrer which is arranged to move in the covered vat and is removable therefrom when the cover is removed, and means for operating the stirrer.

2. An apparatus for changing the temperature of liquids comprising a horizontally elongated trough-like vat having an open top, and side walls and a bottom composed of heat-conducting material, a removable cover for the vat, means for spraying a temperature-changing liquid against the side walls of the vat and causing the liquid to flow downwardly in a film over the outer surface of said walls, a movable stirrer in the covered vat, means for operating the stirrer, and liquid circulating means which receive the temperature-changing liquid flowing from the vat and return the same to the spraying means.

3. An apparatus for changing the temperature of liquids comprising a trough-like vat having an open top, and side walls and a bottom composed of heat-conducting material, a removable cover for the vat, a casing spaced from the bottom and side walls of the vat and forming an air chamber enveloping the same, means for discharging a temperature-changing liquid against the side walls of the vat and causing the liquid to flow downwardly in a film over the outer surface of said walls, a stirrer arranged to move in the covered vat, and means for operating the stirrer.

4. An apparatus for changing the temperature of liquids comprising a trough-like vat having an open top, and side walls and a bottom composed of heat-conducting material, a removable cover for the vat, a casing spaced from the bottom and side walls of the vat and forming an air chamber enveloping the same, means for discharging a temperature-changing liquid against the side walls of the vat and causing the liquid to flow downwardly in a film over the outer surface of said walls, and liquid circulating means which take the temperature-changing liquid from said casing and return the same to the liquid discharging means.

5. An apparatus for changing the temperature of liquids comprising a horizontally elongated trough-like vat having an open top, and side walls and a rounded bottom composed of heat-conducting material, a removable cover for the vat, a casing spaced from the bottom and side walls of the vat and forming an air chamber enveloping the same, means for spraying a temperature-changing liquid against the side walls of the vat within the casing and causing the liquid to flow downwardly in a film over the outer surface of said walls and bottom of the vat, a stirrer arranged to reciprocate horizontally in the covered vat, means for reciprocating the stirrer, and liquid circulating means which take the temperature-changing liquid from said casing and return the same to the spraying means.

6. The combination with a vat, of a reciprocating stirrer arranged in the same, an actuating mechanism for the stirrer, a flexible connection extending from said actuating mechanism to said stirrer and moving the same in one direction, and a weighted return device connected with said stirrer and adapted to move the same in the opposite direction.

7. The combination with a vat, of a reciprocating stirrer comprising a movable frame arranged above the vat, and stirrer blades secured to said frame and depending therefrom into the vat, means arranged outside of the vat at opposite sides thereof for supporting and guiding said frame in its reciprocating movement, a cover which closes said vat and incloses said stirrer, actuating mechanism for the stirrer, and a flexible connection between said mechanism and said stirrer.

8. The combination with a vat, of a reciprocating stirrer comprising a movable frame arranged above the vat, stirrer blades secured to said frame and depending therefrom into the vat, means for supporting and guiding said frame in its reciprocating movement, an actuating mechanism for the stirrer, a flexible connection between said stirrer and said actuating mechanism adapted to move the stirrer in one direction, and a weighted return device connected with said stirrer and adapted to move the same in the opposite direction.

9. The combination with a vat and a cover therefor having walls depending around the upper portion of the walls of the vat, of a reciprocating stirrer, supporting and guiding means for the stirrer arranged outside of the vat between the walls thereof and the depending walls of the cover, and actuating mechanism for said stirrer.

10. The combination with a plurality of vats and reciprocating stirrers arranged in the same, of a common actuating mechanism for said stirrers, flexible connections extending from said actuating mechanism to said stirrers and moving the same in one direction, and weighted return devices connected with said stirrers and adapted to move the same in the opposite direction.

11. The combination with a vat and supporting rollers arranged outside said vat in fixed supports, of a reciprocating stirrer frame resting on said rollers and having blades depending into the vat.

12. The combination with a vat and supporting rollers arranged outside said vat in fixed supports, of a reciprocating stirrer comprising side bars which rest on said rollers, and stirrer blades which depend into the vat.

13. The combination with a vat provided with an outwardly-projecting top flange, rollers mounted on said flange of the vat, and a reciprocating stirrer resting on said rollers.

14. The combination with a vat provided with an outwardly-projecting top flange, an outer casing provided with an inwardly-projecting top flange on which said flange of the vat is supported, rollers mounted on said flange of the vat, and a reciprocating stirrer resting on said rollers.

15. The combination with a vat provided with an outwardly-projecting top flange, an outer casing provided with an inwardly-projecting top flange on which the vat flange is supported, a frame supporting said casing and comprising uprights to which the sides of the casing are secured and cross members which support the bottom of the casing, and a stay device interposed between the bottom of the casing and that of the vat.

16. The combination with a vat, of a channel surrounding the top of the vat, a reciprocating stirrer, supports for the stirrer arranged in said channel, and a cover for the vat extending into said channel and inclosing the stirrer.

Witness my hand in the presence of two subscribing witnesses.

HARVEY FELDMEIER.

Witnesses:
JESSIE E. MERCHANT,
ETTA M. WICKS.